UNITED STATES PATENT OFFICE.

JOHANN CARL WILHELM FERDINAND TIEMANN, OF BERLIN, GERMANY, ASSIGNOR TO HAARMANN & REIMER, OF HOLZMINDEN, GERMANY.

PROCESS OF DECOMPOSING IONONE.

SPECIFICATION forming part of Letters Patent No. 650,028, dated May 22, 1900.

Application filed February 6, 1899. Serial No. 704,722. (No specimens.)

*To all whom it may concern:*

Be it known that I, JOHANN CARL WILHELM FERDINAND TIEMANN, a subject of the King of Prussia, German Emperor, residing at Berlin, in the Kingdom of Prussia, German Empire, have invented a certain new and useful process for splitting up ionone into the two varieties alpha- and beta-ionone by means of alkali bisulfite or alkali sulfite, respectively, of which the following is a specification.

As I have shown in the *Berichte der Deutschen Chemischen Gesellschaft*, No. 31, (1898,) page 851, ionone can be purified by several hours' boiling with a solution of sodium bisulfate, which dissolves the ionone, the impurities present being removed by extraction with a suitable extracting agent, such as ether, and the ionone liberated from the aqueous solution thus purified by heating with alkaline hydrate.

I have found that in this process the solution of sodium bisulfite may be replaced by a solution of sodium sulfite, to which any suitable agent is added which at the boiling temperature of the solution employed neutralizes the sodium hydrate which becomes disengaged in the reaction. This purpose is, for instance, attained by means of an addition of a little more than one molecular weight of glacial acetic acid to one molecular weight of sodium sulfite ($Na_2SO_3$) or by an addition of sulfate of ammonia, from which the alkaline hydrate liberated expels the ammonia at the boiling temperature of the solution. Moreover, I have found, first, that in evaporating the neutral or feebly-alkaline solution obtained in heating ionone with a solution of alkali bisulfite the alkali salts of the derivatives of the hydrosulfonic acid of the alpha-ionone formed in this mutual reaction will be the first to crystallize out, and, second, that by subjecting the neutral or only feebly-alkaline solution of ionone obtained by boiling ionone with alkali bisulfite, or with alkali sulfite and acetic acid, or with alkali sulfite and sulfate of ammonia to the distillation in a strong current of steam chiefly beta-ionone only is set free and passes over into the distillate. If an excess of alkali is added to the solution after it has ceased to yield an oily distillate, chiefly alpha-ionone only is eliminated therefrom by treatment with steam, which can be recovered by either extracting the rapidly-cooled liquid with a suitable solvent, such as ether, or by distillation in a current of steam after previous neutralization with an acid.

If properly carried out, the separation described of the two varieties of the ionone—alpha- and beta-ionone—from each other will be found to be nearly quantitative.

Beta-ionone is characterized by the well-known semicarbazone, the melting-point of which is at 148° centigrade. Beta-ionone may be still further purified by converting it into the crystallized semicarbazone melting at 148° centigrade and by splitting the same by means of sulfuric acid.

Alpha-ionone is characterized by the well-known easily-crystalling oxim melting directly at a temperature of 87° centigrade, and only after repeated recrystallizations the melting-point is raised for 1° or 2°. By converting the alpha-ionone into the crystallized oxim, and by the known decomposition of the latter by means of sulfuric acid a further purification is effected.

Example: One hundred parts of ionone are boiled with a solution in three hundred parts water of one hundred parts of sodium bisulfite or the corresponding quantity of potassium bisulfite or the corresponding quantity of sodium sulfite, ($Na_2SO_3$,) to which is added for each molecular weight of sodium sulfite a little more than one molecular weight of glacial acetic acid or of sulfate of ammonia in excess until a clear solution of the oil is obtained. This is generally effected in from eight to ten hours. The solution, which shows but a feebly-alkaline reaction, is freed from the impurities by agitation with a suitable extracting agent, such as ether. By then treating the solution by a strong current of steam beta-ionone is carried over. If required, this beta-ionone is still further purified by converting it into semicarbazone melting at 148° centigrade and by splitting the latter by means of sulfuric acid. As soon as oil-drops cease to pass over either sodium carbonate is added to the solution from which the beta-ionone has been removed, the alpha-ionone liberated thereby being directly driven off by distillation in a current of steam, or alkaline lye is added, and after a short time the liquor is rapidly cooled, whereupon alpha-ionone is obtained by agitation with ether, or I may also proceed by heating the solution for a short time with alkaline lye for liberating alpha-ionone from its hydro-sulfonic acid salts, cool down rapidly, neutralize with any suitable acid, and finally distil the alpha-ionone over in a current of steam.

If required, alpha-ionone may be still further purified by converting it into the crystallized oxim, melting at 87° centigrade, and by decomposing the latter by means of an acid.

If the ionone under consideration contains but very small quantities of the beta-ionone, a fact of but rare occurrence, the solution obtained by boiling ionone with alkali bisulfites may be evaporated. The alkali salts of the hydrosulfonic acid of the alpha-ionone obtained by crystallization from the cooled solution are then filtered off and the separation of the alpha- and beta-ionone is then effected, as above described, in the mother liquid filtered off from the crystals.

What I claim, and desire to secure by Letters Patent of the United States, is—

1. The process for decomposing ionone into alpha and beta ionone, which consists in boiling the ionone with an alkali sulfite in the presence of a binding agent for any liberated alkaline hydrate, and subjecting the resulting solution to steam distillation, substantially as described.

2. The process for decomposing ionone into alpha and beta ionone, which consists in boiling the ionone with an alkali sulfite in the presence of a binding agent for any liberated alkaline hydrate, subjecting the resulting solution to steam distillation, and extracting alpha ionone from the remaining solution, substantially as described.

3. The process for decomposing ionone into alpha and beta ionone, which consists in boiling the ionone with an alkali sulfite in the presence of a binding agent for any liberated alkaline hydrate, subjecting the solution to steam distillation, and adding alkali to the remaining solution to liberate the alpha ionone, substantially as described.

In witness whereof I have hereunto signed my name in the presence of two subscribing witnesses.

JOHANN CARL WILHELM FERDINAND TIEMANN.

Witnesses:
OTTO HERING,
GUSTAV HÜLSMANN.